United States Patent [19]
Werner

[11] Patent Number: 5,387,454
[45] Date of Patent: Feb. 7, 1995

[54] PROCESS OF MAKING A VELOUR NEEDLE FELT

[75] Inventor: Rudolf Werner, Linz, Austria

[73] Assignee: Textilmaschinenfabrik Dr. Ernst Fehrer Aktiengesellschaft, Leonding, Austria

[21] Appl. No.: 218,571

[22] Filed: Mar. 28, 1994

[30] Foreign Application Priority Data

Apr. 13, 1993 [AT] Austria ................... A726/93

[51] Int. Cl.⁶ .............................................. B32B 3/02
[52] U.S. Cl. ............................... 428/85; 28/109;
28/158; 156/72; 156/148; 428/95; 428/280;
428/282; 428/284; 428/300
[58] Field of Search ............... 428/85, 95, 280, 300,
428/282, 284; 28/107, 109, 158, 159, 160, 163;
156/72, 148

[56] References Cited

U.S. PATENT DOCUMENTS 4,369,218 1/1983 Mazere ...................... 428/280
4,935,295 6/1990 Serafini ..................... 428/300
5,080,951 1/1992 Guthrie .................... 428/300

FOREIGN PATENT DOCUMENTS 2011335 9/1970 Germany.

*Primary Examiner*—James J. Bell
*Attorney, Agent, or Firm*—Collard & Roe

[57] ABSTRACT

To make a velour needle felt, an optionally pre-needled staple fiber non-woven web is applied to a revolving brushlike support and is then needled to form a pile on the side which faces the support. To increase the resistance of the velour needle felt to distortion, it is proposed that a layer which has a higher resistance to distortion than the staple fiber non-woven web and consists particularly of a spun-bonded web is applied to the brushlike support before the staple fiber non-woven web is applied thereto and that the pile fibers are pulled in the needling operation through the layer which has the higher resistance to distortion.

8 Claims, 2 Drawing Sheets

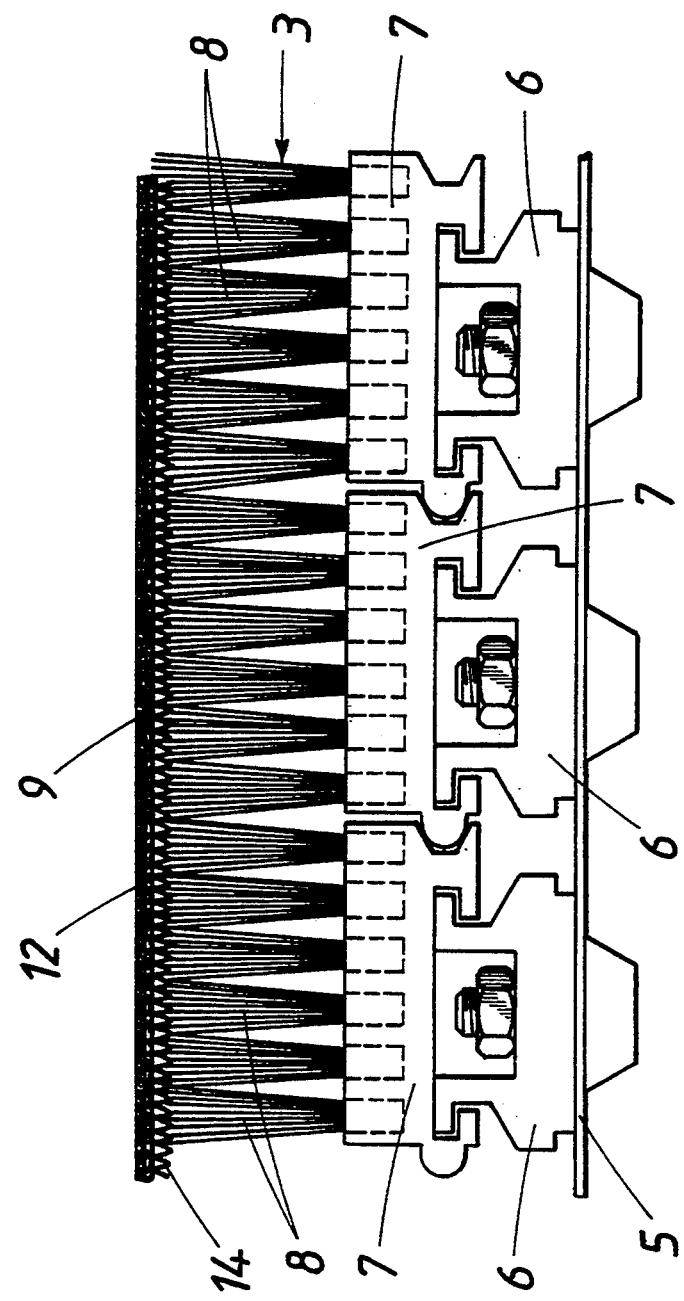

PROCESS OF MAKING A VELOUR NEEDLE FELT

BACKGROUND OF THE INVENTION

1. Field of the Invention

This invention relates to a process of making a velour needle felt wherein an optionally preneedled staple fiber non-woven web is applied to a revolving brushlike support and is subsequently needled on that side which faces the support in order to form a pile thereon.

2. Description of the Prior Art

Needle felts cannot be made unless a surface pattern with a pronounced pile is formed if the needle felt is to be made from a staple fiber non-woven web which is applied to a revolving support for supporting the web as it is needled. This is due to the fact that the fibers engaged by the needles are needled into the brush of the support and impart a velourlike appearance to the felt which has thus been needled. But particularly if such velour needle felts have only a low base weight they will have only a restricted resistance to distortion and this is undesirable for some applications for which a dimensionally stable felt is required.

SUMMARY OF THE INVENTION

For this reason it is an object of the invention to provide for making a velour needle felt of the kind described first hereinbefore a process which is so improved with simple means that the resistance of the velour needle felt to distortion and abrasion can considerably be increased, particularly in the case of felts having a low base weight, whereas the formation of a pronounced pile is not adversely affected.

The object set forth is accomplished in accordance with the invention in that a layer which has a higher resistance to distortion than the staple fiber non-woven web and consists particularly of a spunbounded web is applied to the brush-like support before the staple fiber non-woven web is applied thereto and that the pile fibers are pulled in the needling operation through the layer which has the higher resistance to distortion.

The velour needle felt made by that process comprises a staple fiber non-woven web having pile fibers protruding on one side and is characterized in that the felt comprises a layer which has a higher resistance to distortion than the staple fiber non-woven web and is joined thereto by said pile fibers extending through said layer.

Because the pile fibers of the staple fiber non-woven web are pulled during the needling operation through a layer which has a higher resistance to distortion, the resistance of the velour needle felt to distortion is considerably increased. Because the pile fibers pulled through the layer having a higher resistance to distortion are additionally held by said layer, the anchoring of the pole pile fibers in the velour needle felt is improved and this results in a higher resistance to abrasion. The needling of the pile fibers through the layer will hardly adversely affect the formation of the pile if a suitable layer is selected. Spunbonded webs may desirably be used for that purpose because owing to their continuous fibers they have a high resistance to distortion in spite of their low base weight. In special applications a spunbonded web might be replaced by a staple fiber non-woven web, e.g., one which has been thermally consolidated, or a woven fabric or a plastic film.

The layer having the higher resistance to distortion has mainly the function to ensure a sufficient dimensional stability of the velour needle felts even in case of a relatively low base weight. It will be understood that the formation of a pile extending through the interposed layer must not be adversely affected to an appreciable degree by the interposed layer. For this reason the interposed layer may desirably consist of a spunbonded web, which has a base weight that is related in a ratio of 1:5 to 1:12 to the base weight of the staple fiber non-woven web which is employed. With such a ratio of the base weights the interposed layer will not visually be apparent in the velour needle felt.

Because the resistance of velour needle felts to distortion can considerably by improved by the provision of an interposed layer which has a higher resistance to distortion than the staple fiber non-woven web which is employed, it is desirably possible to make blankets or the like from such velour needle felts in that the needling operation is succeeded by an operation in which two layers of velour needle felt are superimposed so that their piles face outwardly and are subsequently joined by being needled in certain regions.

BRIEF DESCRIPTION OF THE DRAWING

FIG. 2 is a schematic longitudinal sectional view showing the needle felt lying on the brushlike support.

DETAILED DESCRIPTION OF THE PREFERRED EMBODIMENT

Figure 1:
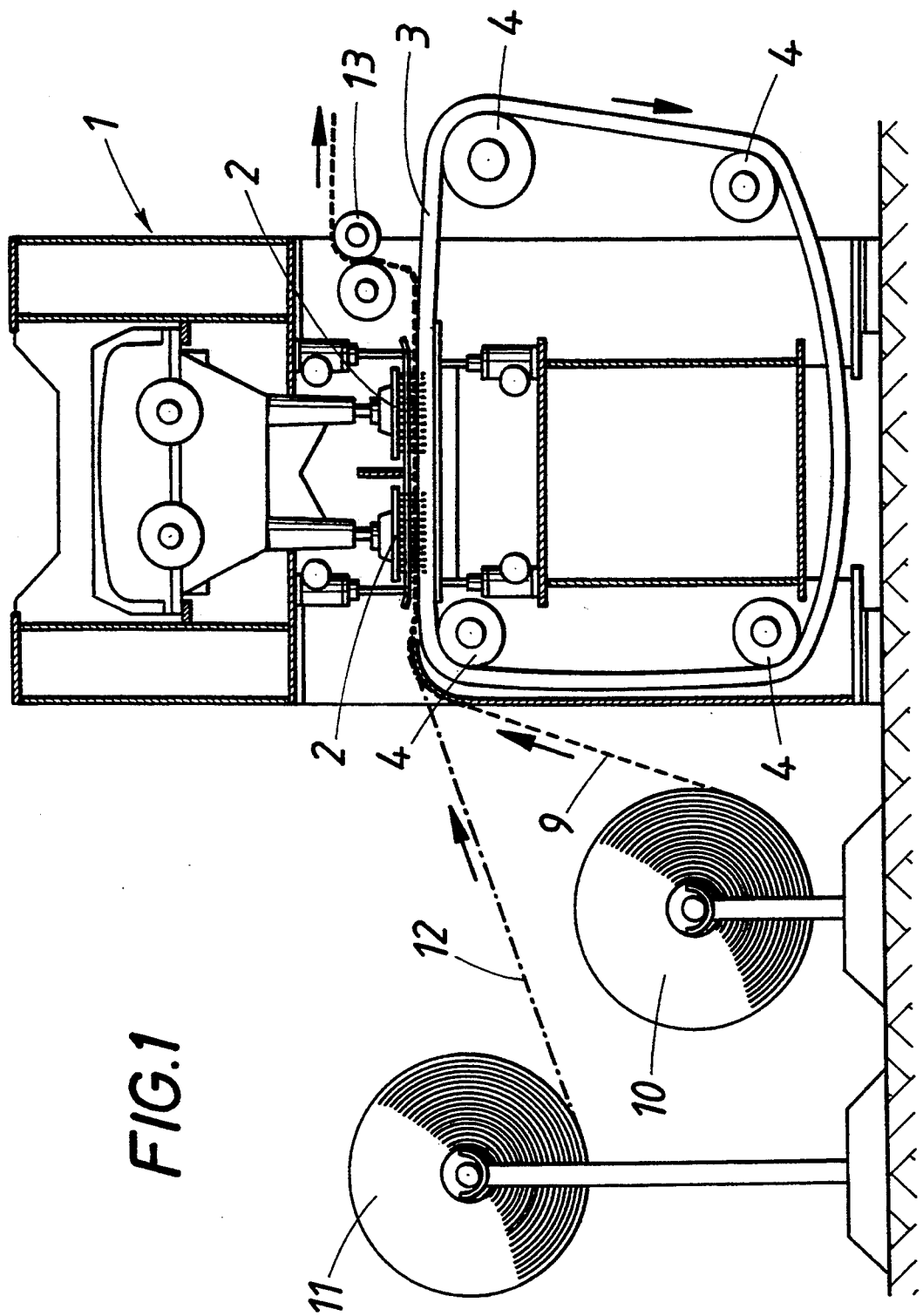
FIG. 1 is a schematic vertical sectional view taken on a line extending in the direction of travel of the non-woven web and shows an apparatus for making a velour needle felt in accordance with the invention.

The process in accordance with the invention for making a velour needle felt will be explained more in detail with reference to the drawing.

As is apparent from FIG. 1, the apparatus for making a velour needle felt in accordance with the invention essentially consists of a needling machine 1, in which needle boards 2 are adapted to be driven to reciprocate up and down and cooperate with a revolving brushlike support 3. That support comprises an endless traction element 5, which is trained around reversing pulleys 4 and is provided with holders 6 for replaceably mounted brush bodies 7, as is apparent from FIG. 2. Said brush bodies 7 carry tufts of bristles 8 to provide a support for the material being needled so that the needles of the needle boards 2 pierce the material being needled and then enter the bristle tufts 8.

To make a velour needle felt, a spunbonded web 9 is applied to the brushlike support. The web 9 is unwound from a supply roll 10. The stable fiber non-woven web 12 is also unwound from a supply roll 11 and may optionally be pre-needled and is applied to that spunbonded web and is needled together with the spunbonded web 9. During that needling operation, fibers are needled from the staple fiber non-woven web 12 through the spunbonded web 9 into the brushlike support 3 and a velour effect is thus produced. The needled non-woven web is then removed from the brushlike support 3 by a take-off mechanism 13.

It is diagrammatically indicated in FIG. 2 that the joint needling of the staple fiber non-woven fabric 12 and the spunbonded web 9 has the result that fibers are pulled through the spunbonded web to form a pronounced pile 14, by which the spunbonded web 9 is completely covered so that the spunbonded web is not directly visible apparent in the velour needle felt but owing to its higher resistance to distortion ensures that the velour needle felt has a much higher resistance to distortion and resistance to abrasion. For instance, a staple fiber non-woven fabric having a base weight of 150 g/m² may be used to make a velour needle felt having a sufficient dimensional stability if a spunbonded web having a base weight of, e.g., 20 g/m² is used. The advantages afforded by the process in accordance with the invention will particularly be obtained if the base weights are low, i.e., if staple fiber non-woven webs having a base weight of up to 200 g/m² are employed.

It will be understood that the invention is not restricted to the embodiment shown by way of example. For instance, the spunbonded web 9 might be replaced by a woven fabric, a plastic film or a staple fiber non-woven web which has, e.g., been thermally consolidated, if said materials form a layer which has a correspondingly higher resistance to distortion than the staple fiber non-woven web and permit pile fibers to be needled through such materials

I claim:

1. In a process of making a velour needle felt, wherein a staple fiber non-woven web is applied to a revolving brushlike support and while lying on said support is needled to form a pile on the side facing said support,
    wherein the improvement comprises the steps of
    applying a layer having a higher resistance to distortion than said web to said support before said staple fiber non-woven web is applied, and
    needling said staple fiber non-woven web to pull pile fibers of said web through said layer.

2. The improvement set forth in claim 1, wherein said staple fiber non-woven web is pre-needled before it is applied to said support.

3. The improvement set forth in claim 1, wherein said layer having a higher resistance to distortion is a spunbonded web.

4. The improvement set forth in claim 3, wherein the ratio of the base weight of the spunbonded web to the base weight of the staple fiber non-woven web is 1:5 to 1:12.

5. The improvement set forth in claim 1, wherein the needling operation is succeeded by an operation in which two layers of velour needle felt are superimposed with outwardly facing piles and are subsequently joined by being needled in certain regions.

6. In a velour needle felt comprising a staple fiber non-woven web having pile fibers protruding on one side,
    wherein the improvement comprises
    a layer which has a higher resistance to distortion than the staple fiber non-woven web and is joined thereto by said pile fibers extending through said layer.

7. The improvement set forth in claim 6, wherein said layer consists of a spun-bonded web.

8. The improvement set forth in claim 7, wherein the ratio of the base weight of the spunbonded web to the base weight of the staple fiber non-woven web is 1:5 to 1:12.

* * * * *